US010890519B2

(12) United States Patent
Van Den Hoogen et al.

(10) Patent No.: US 10,890,519 B2
(45) Date of Patent: Jan. 12, 2021

(54) SENSOR SYSTEM FOR SENSING THE MASS CONCENTRATION OF PARTICLES IN AIR

(71) Applicant: PRODRIVE TECHNOLOGIES B.V., EM Son (NL)

(72) Inventors: Djarek Hendrikus Josephus Maria Van Den Hoogen, Schaijk (NL); Timmy Jacobus Adrianus Staps, Tilburg (NL); Krzysztof Stanislaw Szymczyk, Eindhoven (NL)

(73) Assignee: PRODRIVE TECHNOLOGIES B.V., Son (NL)

( * ) Notice: Subject to any disclaimer, the term of this patent is extended or adjusted under 35 U.S.C. 154(b) by 216 days.

(21) Appl. No.: 16/311,358

(22) PCT Filed: Jun. 20, 2017

(86) PCT No.: PCT/EP2017/065145
§ 371 (c)(1),
(2) Date: Dec. 19, 2018

(87) PCT Pub. No.: WO2017/220618
PCT Pub. Date: Dec. 28, 2017

(65) Prior Publication Data
US 2019/0331589 A1 Oct. 31, 2019

(30) Foreign Application Priority Data
Jun. 20, 2016 (NL) ...................... 2017001

(51) Int. Cl.
*G01N 15/14* (2006.01)
*G01N 15/02* (2006.01)
(52) U.S. Cl.
CPC ..... *G01N 15/1459* (2013.01); *G01N 15/0205* (2013.01); *G01N 15/0255* (2013.01); *G01N 2015/025* (2013.01)

(58) Field of Classification Search
CPC ........... G01N 15/1459; G01N 15/0205; G01N 15/0255; G01N 2015/025; G01N 1/2247;
(Continued)

(56) References Cited

U.S. PATENT DOCUMENTS

| 5,932,795 A | 8/1999 | Koutrakis et al. |
| 2006/0169065 A1 | 8/2006 | Solomon et al. |

(Continued)

FOREIGN PATENT DOCUMENTS

| WO | 98/32001 A1 | 7/1998 |
| WO | 2009/021123 A1 | 2/2009 |
| WO | 2015008519 A1 | 1/2015 |

OTHER PUBLICATIONS

European Patent Office, International Search Report and Written Opinion of the International Searching Authority, dated Sep. 12, 2017, in PCT/EP2017/065145, which is the international application to this U.S. application.

*Primary Examiner* — Benjamin R Schmitt
(74) *Attorney, Agent, or Firm* — Kolitch Romano LLP

(57) ABSTRACT

The present application relates to sensor systems for sensing mass concentration of particles smaller than a predetermined threshold in an air stream. Such systems may include an inlet (for receiving a total flow of air with particles) connected to a first splitter (for separating the total flow into a major flow and a minor flow), a joint where a first duct carrying the major flow and a second duct carrying the minor flow come together, and a sensor in the first duct for measuring the amount of particles smaller than the predetermined threshold in the major flow.

21 Claims, 5 Drawing Sheets

(58) Field of Classification Search
CPC .... G01N 15/06; G01N 1/2202; G01N 1/2208; G01N 2015/0693; B60H 1/00735; B60H 1/00792; B60H 2001/00721
USPC .............................................. 73/28.01, 31.05
See application file for complete search history.

(56) References Cited

U.S. PATENT DOCUMENTS

| | | |
|---|---|---|
| 2009/0039249 A1 | 2/2009 | Wang et al. |
| 2010/0288921 A1 | 11/2010 | Wang et al. |
| 2011/0186436 A1* | 8/2011 | Novosselov .............. G01J 1/58 204/600 |
| 2011/0226675 A1* | 9/2011 | Holden .................. B01D 45/08 209/133 |
| 2014/0245817 A1 | 9/2014 | Gainey, Jr. et al. |

* cited by examiner

SENSOR SYSTEM FOR SENSING THE MASS CONCENTRATION OF PARTICLES IN AIR

FIELD

The present disclosure relates to a sensor system for sensing the mass concentration of particles in air, a sensor unit and a method for operating said sensor unit. The present disclosure further relates to a vehicle comprising a sensor system and a sensor unit.

INTRODUCTION

Fine particulate matter has been receiving increasing attention during the past decades due to the increased emissions of these particles and their adverse effects on air quality with respect to health. These particles typically have an aerodynamic diameter smaller than 10 µm (i.e. PM10), wherein the smaller particles (e.g. smaller than or equal to 2.5 µm or PM2.5, smaller than or equal to 1.0 µm or PM1.0 and smaller than or equal to 0.1 µm or PM0.1) appear to have the most adverse effect on air quality. In traffic in general and specifically in traffic jams, in tunnels or at a traffic light the effect on air quality may even be further aggravated because of the increased local particle concentrations in these circumstances for instance due to increased emissions and/or limited ventilation.

Sensor systems for sensing the mass concentration of particles comprising solid and/or liquid matter in real time are known in the art. Most of the known systems are not suitable to be used in applications where conditions (e.g. vibration, temperature, humidity, pressure) are variable and other constraints (e.g. size, weight, noise) are applicable, like the sampling of air from various sources in and around a moving vehicle (e.g. environmental air, air from the HVAC system or cabin air).

For instance, WO2009/021123 discloses a sensor system for measuring size segregated particle mass concentrations. This sensor system may provide a simultaneous and real time indication of the mass concentration, optical particle size distribution and aerodynamic particle size distribution of the interrogated particle stream by means of measuring pulse heights and/or time-of-flight. It is therefore ideally suited for laboratory and other test environments. However, in most situations it is not necessary to determine the complete spectra of particle size distributions. Therefore, such a sensor system is more complex than is required if only the aggregated mass concentration of particles smaller than a certain threshold is of interest. Consequently it is typically more costly, fragile, heavier and larger than is required and suitable in various situations (e.g. in a vehicle). Furthermore, this sensor system uses pumps or blowers capable of generating a high pressure gradient to generate a constant flow, which are typically more bulky, noisier and consume more power than is acceptable in some circumstances.

WO2015/008519 describes a simpler sensor system for sensing mass concentration of particles in air. This sensor system is equipped with a single fan, a virtual impactor and two ducts that in combination are responsible for generating a flow of air in the interrogation volume that is deprived of particles that are larger than a certain threshold by means of separation based on inertia. The sensor system can thereby select the particles of interest in a flow. The mass concentration of all particles in this flow combined can be sensed and is indicative for the aggregated mass concentration of particles smaller than a certain threshold (e.g. PM2.5). Furthermore, a system using a fan for producing the flow does not produce as much noise or consume as much power as a system that uses pumps (e.g. >100.000 Pa) or blowers (e.g. 500-1000 Pa) that produce high pressure gradients. However, a disadvantage of the described sensor system is that it is optimized for a continuous real-time measurement of particles that are smaller than a single (or a small range of) threshold(s), because the geometry of the virtual impactor is fixed and varying the total flow will consequently not only change the particle size threshold but also alter the separating efficiency.

SUMMARY

It is thus one purpose of the present disclosure to provide a system for real time sensing the mass concentration of particles (e.g. PM2.5) in a sample flow of ambient air, which may be extracted from the environment, the cabin or ventilation (e.g. HVAC) system of a vehicle. This information may be used to inform the driver regarding the current mass concentration level of particles. Furthermore, it may be used to decide or automatically select which source of air is used for ventilating the cabin of the vehicle and thus provided to the driver. Alternatively, it may be used to indicate filter performance or determine maintenance requirements.

The present disclosure thereto proposes a sensor system for sensing the mass concentration of particles smaller than a predetermined threshold in an air stream, comprising an inlet for receiving a total flow of air with particles, the inlet connected to a first splitter for separating the total flow of air into a major flow and a minor flow, wherein the major flow comprises particles smaller than the predetermined threshold and the minor flow comprises particles larger than the predetermined threshold; and for leading the major flow to a first duct and for leading the minor flow to a second duct, a joint, wherein the first duct and the second duct come together, and an outlet, coupled to the joint, a sensor, arranged in the first duct for measuring an amount of particles (e.g., a mass amount) smaller than the predetermined threshold comprised in the major flow; and a first flow fan for drawing the total flow through the system.

The amount sensed by the sensor may be correlated to the mass concentration that is to be sensed. The sensor is advantageously an optical sensor configured to illuminate the major flow with a light beam. The sensor is advantageously configured to measure light scattered by the particles flowing in the major flow.

According to one aspect, the sensor system comprises a second flow fan for drawing the major flow through the first duct.

A sensor system comprising a second flow fan for drawing the major flow through the first duct has the benefit that all flow rates (i.e. total flow, minor flow and major flow) can be adjusted, which enables an optimization of the separation efficiency for a much broader range of particle sizes. For example, 1) the total flow can be increased while keeping the ratio between the major flow and minor flow constant (see S0→S1 in FIG. 6), resulting in a sharper cut-off and a decrease in particle size threshold, or 2) the total flow can be kept constant while decreasing the flowrate in the major flow and thus increasing the flow rate in the minor flow (see S0→S2 in FIG. 6), resulting in a decrease in particle size threshold and a drop of the separation efficiency in the first duct for particles smaller than this threshold. It may be apparent from these examples that a large variety of flow rates can be achieved so filter performance may be enhanced for various particle size thresholds.

Additionally, a sensor system comprising a second flow fan for drawing the major flow through the first duct has the benefit that the flow rate in the inlet, the first duct and the second duct is largely independent of non-stationary environmental conditions and further allows the control of the flow rates more accurately. Therefore, such a sensor system is ideally suitable to sense mass concentrations accurately in an environment where the sampled air is not stationary, like in a moving vehicle or in an HVAC system of a vehicle. A surprising benefit of a sensor system according to the present disclosure is that the threshold particle size can be adjusted by changing the flow rates in the first duct and the second duct. Furthermore, by equipping the first duct with a fan it is possible to generate a sheath flow that limits the pollution of a sensor and thereby extend its lifetime without requiring an additional fan in the duct providing the sheath flow as described in the prior art.

The present disclosure thus provides a sensor system that is in particular suitable for use in an automobile. Here sensing the mass concentration of aerosols is in particular relevant.

The first flow fan may be arranged at various locations, for instance between the inlet and the first splitter or between the joint and the outlet, or in the second duct, that is between the first splitter and the joint. The second flow fan is advantageously arranged in the first duct, i.e. between the first splitter and the joint, and may be arranged upstream or downstream of the sensor.

The advantage of using fans to generate the flow of air is that they are smaller, consume less energy and produce less noise than pumps or blowers that produce high pressure gradients. All types of fans (e.g. axial, radial) may be used as a first fan or a second fan. Preferably, a radial fan is used because it generally produces a higher pressure gradient (e.g. 150 Pa) and thereby a more stable flow than an axial fan. Typically, radial fans with an appropriate form factor and meeting other requirements (e.g. noise production) produce a pressure gradient between 60 and 120 Pa. Specifically, radial fans producing a 100 Pa are well suited.

The total flow contains particles with unknown physical properties, such as an arbitrary diameter. The aim is to measure the particles with an aerodynamic diameter less than a predetermined threshold, which may for instance be PM2.5. This is achieved by firstly separating the total flow by way of a first splitter into a minor and major flow. The first splitter is advantageously configured to split the total flow such that particles in the total flow which are larger than the threshold are substantially all directed to the minor flow and particles in the total flow which are smaller than the threshold are substantially all directed to the major flow. Subsequently, the particles in the major flow are measured to determine the concentration of e.g. PM2.5.

The use of a first splitter has the advantage that the major flow, that reaches the sensor and of which the mass concentration of particles is to be measured, is already deprived of a part of the particles, which simplifies the measurement because it enables the sensing of the mass concentration of all particles comprised in the major flow combined without requiring the additional information regarding the size distribution of the particles. Furthermore, it reduces the exposure of components of the sensor system like the sensor to polluting particles in the major flow that may limit their life time.

All known types of splitters that are capable of producing a major flow that is mainly deprived of particles larger than a chosen threshold may be suitable as a first splitter. Preferably, the first splitter mainly separates the particles larger than a chosen threshold based on inertia, like a cyclone filter or a virtual impactor. These types of splitters have the advantage that they have an improved life time compared to a splitting device, such as an impactor or a filter that uses an impaction surface, on which particles can be deposited during use, to remove particles from a flow. In an embodiment, a cyclone filter may be used in cases where the form factor (e.g. length to width ratio) is suitable. In a preferred embodiment the first splitter comprises a virtual impactor. The benefit of a virtual impactor is that it has a more flexible form factor than a cyclone filter. Furthermore, the first splitter performance does not suffer from particle re-entrainment or particle bounce and it does not have a surface where large particles are deposited like a cyclone filter. The main constituents of a virtual impactor as a first splitter are a first splitter inlet (total flow) with an axis defining the direction of the total flow and a first splitter outlet comprising a fork into at least a first branch (major flow) connected to the first duct and a second branch (minor flow) connected to the second duct. The first and second branches are advantageously oriented such that an angular change in flow direction from the total flow to the first branch is larger than the angular change in flow direction from the total flow to the second branch. For instance, the first branch may be perpendicular to the axis of the first splitter inlet and the second branch may be parallel to the axis of the first splitter inlet. The first splitter may also comprise a nozzle for accelerating the flow velocity of the total flow at the first splitter outlet in order to achieve good separation of particles into the major and minor flow. This accelerating nozzle may be arranged to span the first splitter outlet. Furthermore, the first splitter outlet may comprise a deceleration or pressure reducing nozzle which may be implemented downstream from the acceleration nozzle, for instance in one or more branches to improve the separation efficiency of particles, to reduce the amount of energy that is consumed by the fans and to reduce the pollution of the sidewalls of said branches or connected ducts.

In an embodiment, the total flow of the sensor system is accelerated through an acceleration jet, or nozzle, with decreasing diameter to increase the average velocity of the total flow (e.g. from ~6 mm diameter to ~3 mm diameter). Hereafter, the total flow is split into a parallel (minor flow, e.g. ~6 mm diameter) and perpendicular (major flow, e.g. ~1.5 mm diameter) stream of air by a splitter. The arrangement of air channels is such that particles tend to continue their initial trajectory, when the particle's inertia is dominant. This effect becomes stronger when the acceleration and splitting of flows is followed up by an abrupt deceleration of the flow velocity. Smaller particles with less inertia tend to follow streamlines that define the average direction of the flow. The splitter therefore advantageously comprises a parallel branch and a perpendicular branch, for splitting the total flow in the minor flow that leads to an outlet via the second duct and the major flow that leads to the outlet via a first duct.

In an embodiment, the system comprises a controller for controlling the first and the second fan speeds, wherein the controller is configured to control the first and the second fan speeds to control the flow rates in the major and minor flow such that a predetermined ratio between major and minor flow is obtained. In situations where the threshold particle size is fixed the first and second fan speeds may be chosen to be constant. Typically, the bulk of the total flow is passed through to the major flow and a substantially smaller part (e.g. 10-20%) of the total flow is passed through to the minor flow. This ensures that most of the particles of interest are passed through to the major flow in order to be measured, while just few enter the minor flow. In an embodiment according to the present disclosure, the major flow rate is smaller than the minor flow rate (e.g. between 1:5 and 1:20), preferably 1:10. The flow rate in the major flow in absolute sense may for example range from 0.1 to 1 L/min and preferably is approximately 3 L/min, while the total flow in absolute sense may for example range from 1 to 10 L/min and preferably is approximately 0.3 L/min. The advantage of having a major flow rate that is smaller than the minor flow rate is that it decreases the amount of particles larger than the threshold that enter the major flow and thereby distort the measurement considerably, because larger particles have a greater effect on mass concentration than smaller particles. Furthermore, it limits the pollution of the sensor, because less particles are provided to this sensor. In addition, it requires a smaller pressure gradient and thereby consumes less power and enables the use of fans instead of pumps or blower that are more costly, more voluminous and noisier. The latter is even further reduced because the flow near the virtual impactor does not need to be turbulent in order to achieve good separation efficiency in this embodiment.

The system according to the present disclosure may further comprise a second splitter unit that produces sheath air that at least partially surrounds the sample air to reduce the exposure of the sensor to particles that may limit the life time of the sensor. Such a second splitter unit may be arranged in the first duct, upstream from the sensor, wherein the second splitter unit is arranged for creating a sample flow; being a central flow (e.g. cylinder shaped); and a sheath flow; being a coaxial jacket (e.g. cylindrical). Thereto, the system may comprise a first hollow duct (e.g. tube), and a second hollow duct (e.g. tube), enclosing at least a part of the first hollow duct, a second splitter inlet, providing incoming air an essentially unimpeded entrance to the first hollow duct and providing incoming air a parallel entrance to the second hollow duct via a filter (e.g. a fibrous filter). The first hollow tube may have a flow restriction (e.g. cross section) that is designed for obtaining a desired flow ratio between sheath air and sample air.

This sheath flow concept that is accomplished by the second splitter unit is based on the principle that the particles in the sample flow substantially remain in the sample flow, when the amount of mixing of the sample flow and the sheath flow in the optics chamber is negligible. To this end, the sample flow is surrounded by a sheath flow of clean air that provides a pressure gradient preventing particles from escaping the sample flow into the sheath flow.

The clean air of the sheath flow is for instance generated by filtering the particles contained in the part of the major flow that is provided to the filter. The velocity of the sheath flow is lower than the sample flow (e.g. 3× to 7× lower, preferably about 5× lower) such that the dynamic pressure of the sample flow increases at the expense of the static pressure of the sample flow. This results in a static pressure of the sheath flow that is larger than the static pressure of the sample flow. The pressure gradient aims to avoid the particles that are present in the sample flow to diverge out of the sample flow and thereby prevents contamination of the sensor components during operation of the system according to the present disclosure.

In the system, the sensor may comprise an optics chamber, enabling an air flow to trespass, an electromagnetic radiation source, for generating a light beam through the area of the optics chamber for trespassing air, a light trap, for receiving and absorbing the light from the radiation source after trespassing the air flow, and a photon collector, for collecting the light scattered by particles in the trespassing air flow, which according to the prior art is known to be a good measure for the particle mass concentration. Any light source (e.g. LED) may be used, but preferably a laser is used. Lasers have a small spectrum which is a requirement for determining a particle mass concentration reliably. Furthermore, the stability is to a lesser extent influenced by temperature fluctuations. Typically, light in the visible range, preferably in the longer wavelength region (e.g. red, ~655 nm), or in the infrared range is used.

According to a further aspect, there is provided a sensor unit, comprising a housing in which at least two systems as described above are integrated, wherein the respective at least two electromagnetic radiation sources are formed by one and the same device, and wherein the unit comprises a beam splitter, for receiving a light beam from the light source, and for splitting it into at least two beams, which are used in the respective systems. This is advantageous because the intensities of the at least two beams are always correlated and can therefore be immediately compared without requiring any additional measures for compensation. This is particularly advantageous for those cases wherein for instance both an exterior (e.g. the environment of the vehicle) and an interior (e.g. the cabin of the vehicle) PM2.5 concentration is to be measured, and later on compared. The beam splitter may for instance comprise a prism, having a light receiving area and an essentially V-shaped beam splitting mirror surface arranged opposite the light receiving area.

The sensor unit as described above advantageously comprises a dual light beam generator. The dual light beam generator comprises an electromagnetic radiation source such as a diode laser for generating a laser beam and a prism configured for splitting the laser beam into at least two beams. The prism may for example comprise a light receiving area and a beam splitting mirror surface arranged opposite the light receiving area, arranged in a common housing. The beam splitting mirror surface can be essentially V-shaped.

Preferably the sensor unit comprises a processing unit configured for comparing the amount of particles measured in each of the two systems. This information may be used for selecting the source of air that is used for ventilation. Vehicles equipped with a sensor unit according to the present disclosure can for instance automatically select whether the cabin is ventilated with air taken from the environment or from within the cabin. It may also be used to trigger a device (e.g. filter, virtual impactor, cyclone filter) that can remove the small particles from the air source of the ventilation or HVAC system.

DETAILED DESCRIPTION

Figure 1:
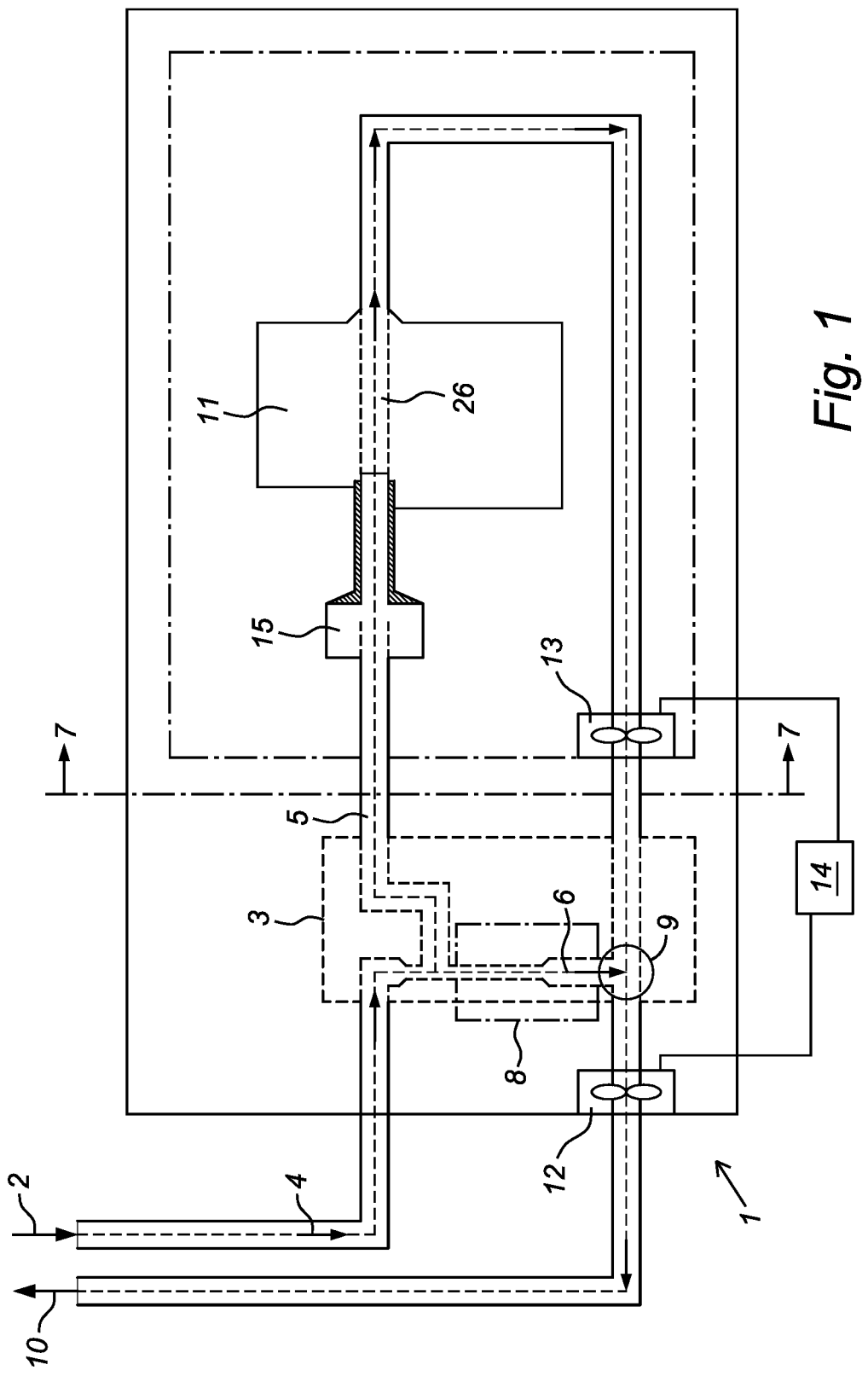
FIG. 1 shows a schematic overview of a system according to the present disclosure.

FIG. 1 shows a schematic overview of a system 1 according to the present invention. The system 1 comprises an inlet 2 for receiving a total flow 4 of air with particles, which inlet 2 is connected to a first splitter 3 for separating the total flow of air into a major flow 5 and a minor flow 6, wherein the major flow 5 comprising particles smaller than the predetermined threshold and the minor flow 6 comprising particles larger than the predetermined threshold and for leading the major flow to a first duct 7 and for leading the minor flow 6 to a second duct 8. Both ducts 7, 8 come together at a joint 9, which is coupled to an outlet 10. The system 1 also comprises a sensor 11, arranged in the first duct 7 for measuring the amount of particles smaller than the predetermined threshold comprised in the major flow 5 and a first flow fan 12 for drawing the total flow 4 through the system 1. The system 1 further comprises a second flow fan 13 for drawing the major flow through the first duct 7. The first flow fan 12 and the second flow fan 13 are coupled to a controller 14 for controlling the first and the second fan speeds such that a predetermined ratio between major and minor flow is obtained. Additionally, the system comprises a second splitter unit 15, arranged in the first duct 7, upstream from the sensor 11.

Figure 2:
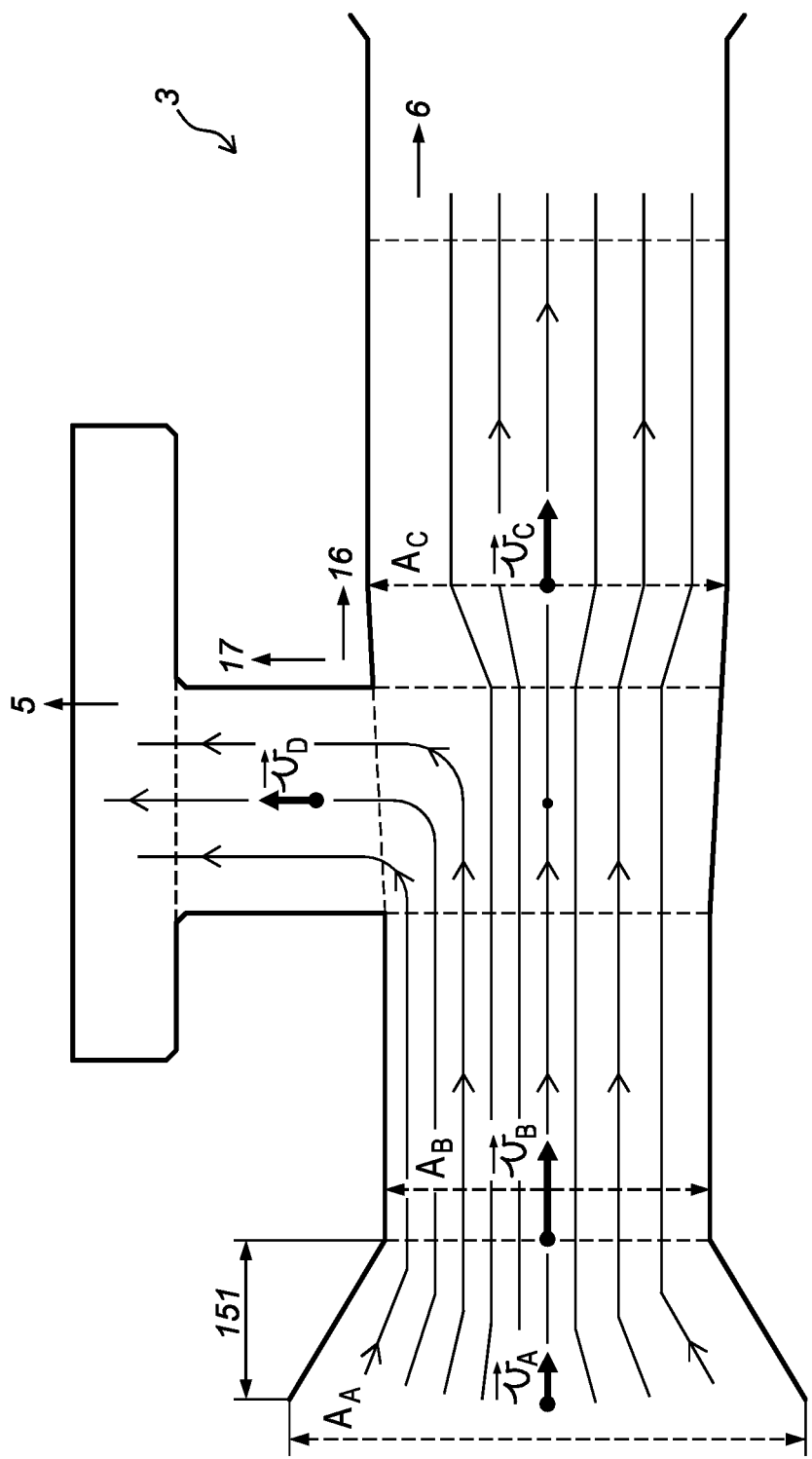
FIG. 2 shows an illustrative first splitter in detail.

FIG. 2 shows the first splitter 3 in detail. The first splitter 3 is a so called virtual impactor. The splitter 3 comprises an acceleration jet (nozzle) 151 for accelerating the total flow 4 from flow velocity $\vec{v}_A$ to $\vec{v}_B$, a first splitter, comprising a parallel branch 16 and a perpendicular branch 17, for splitting the total flow in the major flow 5 with flow velocity $\vec{v}_D$ that leads to the outlet via a first duct 7 and the minor flow 6 that leads to the outlet via a second duct 8. Possibly, a deceleration nozzle may be arranged in the parallel branch to reduce a flow velocity of the minor flow 6 to $\vec{v}_C$. The number of flow lines correlate with the flow rate. The flow rate in the major flow is advantageously smaller than the flow rate in the minor flow.

Figure 3:
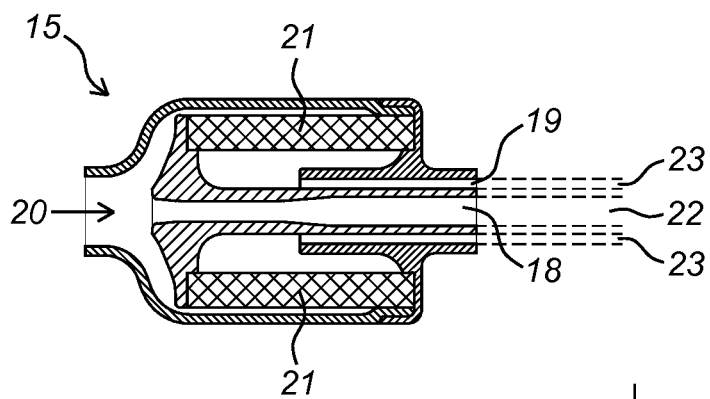
FIG. 3 shows an illustrative second splitter in detail.
Figure 3:
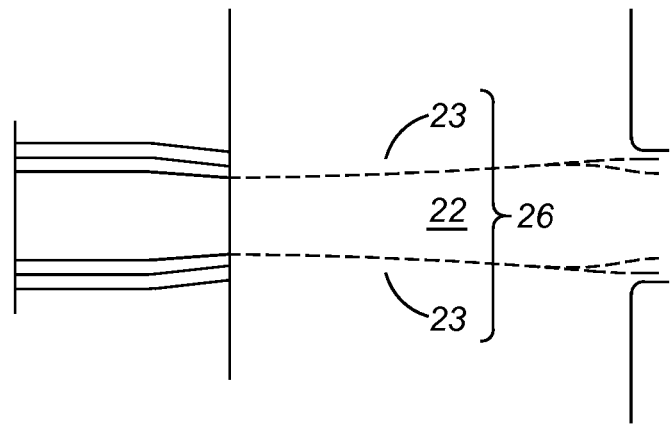

FIG. 3 shows the second splitter 15 in detail. The second splitter comprises a first hollow tube 18 and a second hollow tube 19 enclosing at least a part of the first hollow tube 18, a second splitter inlet 20, providing incoming air an essentially unimpeded entrance to the first hollow tube 18 and providing incoming air a parallel entrance to the second hollow tube 19 via a filter 21. The second splitter 15 is arranged for creating a sample flow 22 being a cylinder shaped central flow and a sheath flow 23 being a coaxial cylinder jacket. The first hollow tube 18 and second hollow tube 19 have a cross section that is designed for obtaining a desired flow ratio between sheath air and sample air.

Figure 4:
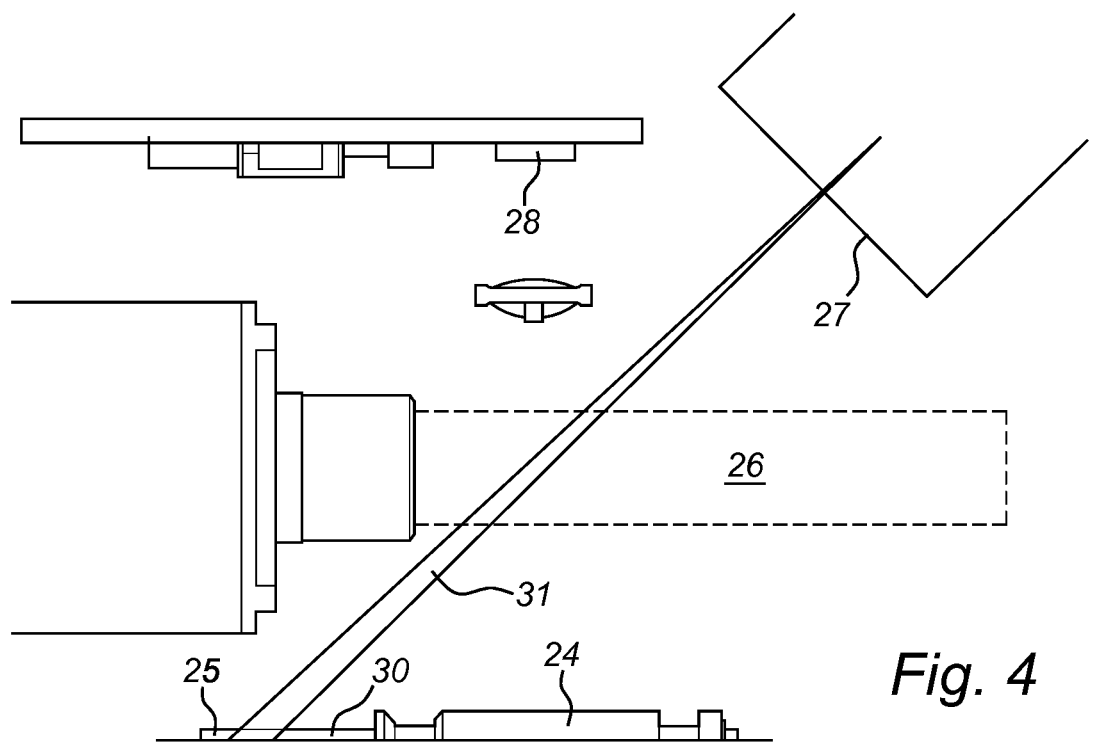
FIG. 4 shows an illustrative optics chamber.

FIG. 4 shows the sensor 11 comprising an optics chamber enabling an air flow to trespass. The chamber comprises an electromagnetic radiation source 24, for generating a light beam 30 and optical elements 25 for forming a light beam 31 through the area of the optics chamber for trespassing air 26 and a light trap 27, for receiving and absorbing the light from the radiation source after trespassing the air flow, as well as a photon collector 28, for collecting the light scattered by the trespassing air flow 26. By comparing the amount of light sent by the source 24 with the amount of light received by the collector 28, the amount of particles can be determined.

Figure 5:
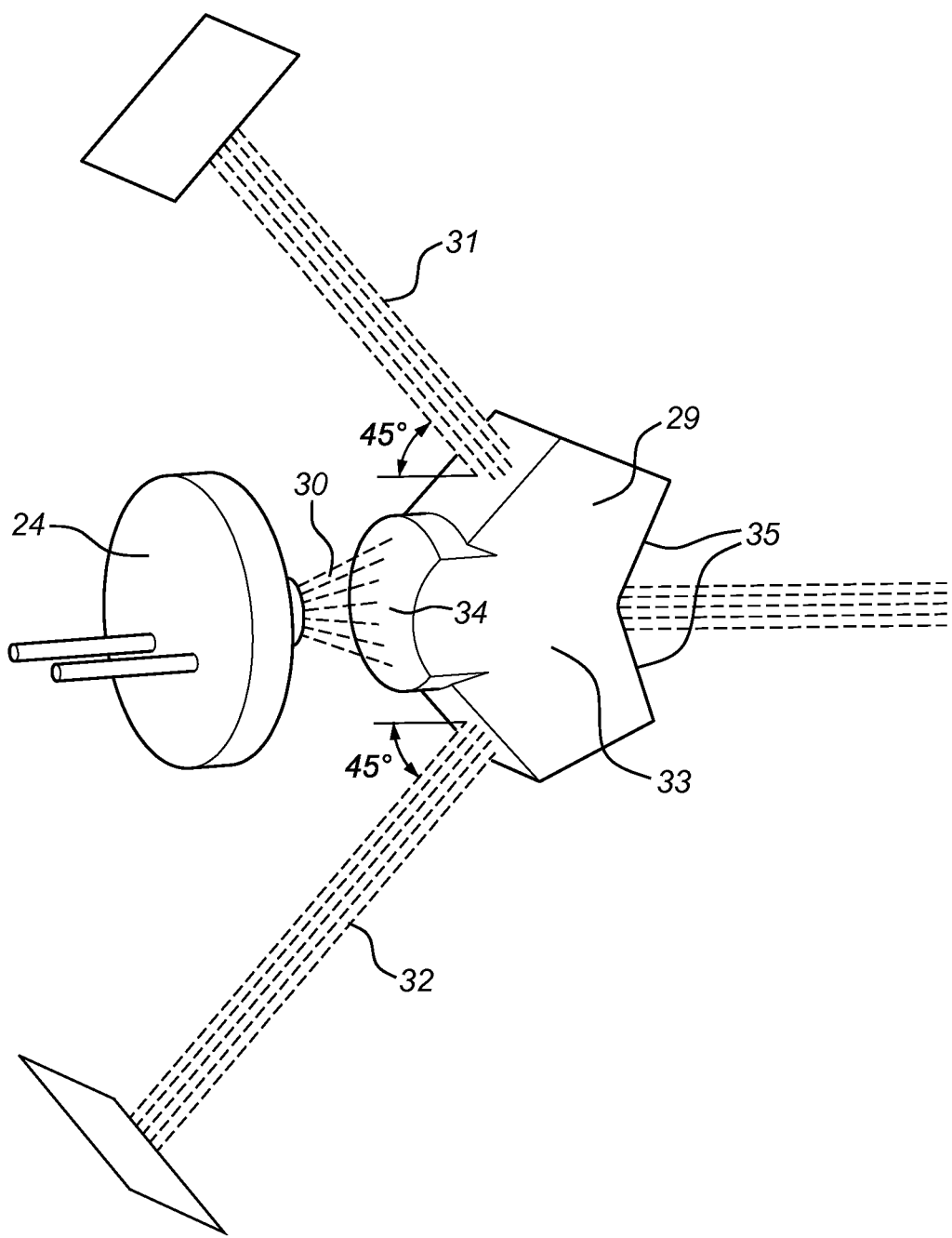
FIG. 5 shows a light source and a beam splitter.

FIG. 5 shows in detail a light source 24 and a beam splitter 29. Since the invention also relates to a sensor unit, comprising housing in which two systems 1 as described above are integrated, wherein the respective two electromagnetic radiation sources 24 are one and the same device, a beam splitter 29 is applied, for receiving a light beam 30 from the radiation source 24, and for splitting it into two beams 31, 32, which are used in the respective systems. The beam splitter 29 comprises a prism 33, having a light receiving area 34 and an essentially V-shaped beam splitting mirror surface 35 arranged opposite the light receiving area. The split beams 31, 32 are reflected in opposite directions and each used in one of the integrated systems 1.

Figure 6:
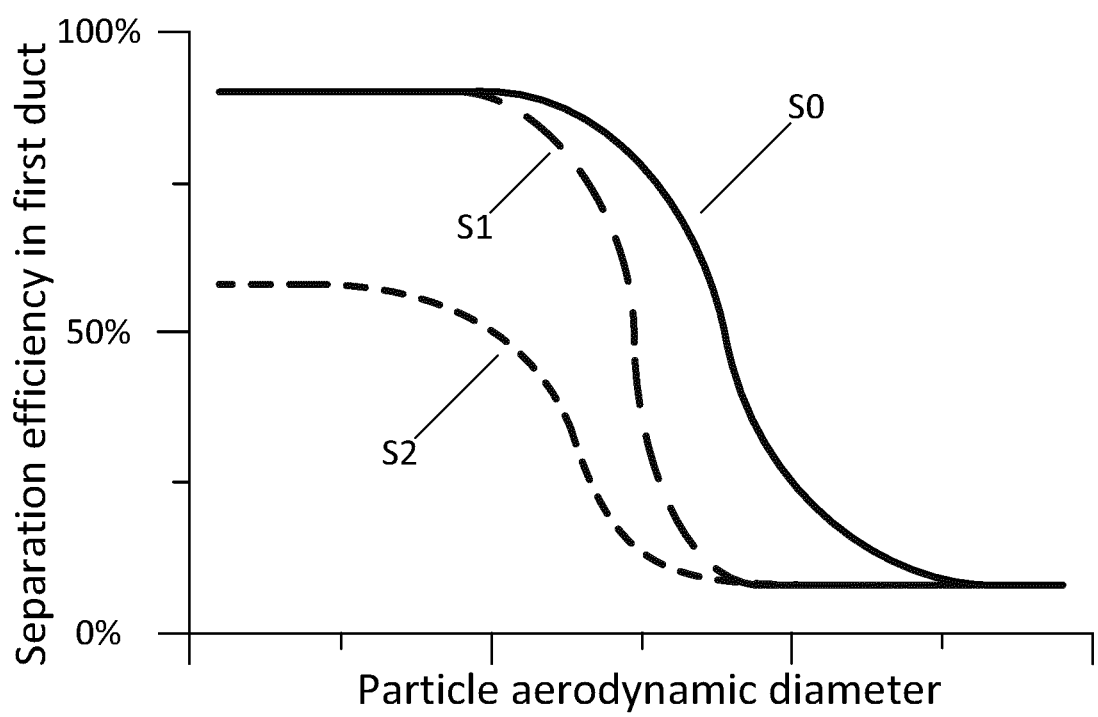
FIG. 6 shows first splitter characteristics for various flow speeds.

FIG. 6 shows a reference situation S0 for the separation efficiency in the first duct of the first splitter for particles with various aerodynamic diameters in the first duct, a situation S1 wherein the total flow is increased while keeping the ratio between the major flow and minor flow constant compared to S0, resulting in a sharper cut-off and a decrease in particle size threshold and a situation S2 wherein the total flow is kept constant while the flowrate in the major flow is decreased and thus the flow rate in the minor flow is increased compared to S0, resulting in a decrease in particle size threshold and a drop of the separation efficiency in the first duct for particles smaller than this threshold.

The series of paragraphs below recites various illustrative combinations of features of the present disclosure. These paragraphs are intended to represent a non-limiting presentation of suitable combinations, and are alphanumerically designated for clarity and efficiency:

A0. Sensor system (1) for sensing mass concentration of particles smaller than a predetermined threshold in an air stream, comprising:
an inlet (2) for receiving a total flow (4) of air with particles, the inlet connected to:
a first splitter (3)
for separating the total flow of air into a major flow (5) and a minor flow (6);
the major flow comprising particles smaller than the predetermined threshold;
the minor flow comprising particles larger than the predetermined threshold; and
for leading the major flow to a first duct (7); and
for leading the minor flow to a second duct (8);
a joint (9), wherein the first duct and the second duct come together, and
an outlet (10), coupled to the joint;
a sensor (11), arranged in the first duct for measuring the amount of particles smaller than the predetermined threshold comprised in the major flow; and
a first flow fan (12) for drawing the total flow through the system; characterised by:
a second flow fan (13) for drawing the major flow through the first duct.

A1. System according to A0, wherein the second flow fan is arranged in the first duct.

A2. System according to A0 or A1, comprising a controller (14) for controlling the first and the second fan speeds.

A3. System according to any one of A0 to A2, wherein the flow rate of the major flow and the flow rate of the minor flow are constant.

A4. Sensor system according to any one of A0 to A3, wherein the first flow fan and the second flow fan are configured to draw the total flow and the major flow such that a ratio of a flow rate of the major flow to a flow rate of the minor flow is smaller than 1, preferably between 1:5 and 1:20, even more preferably 1:10.

A5. System according to any one of A0 to A4 wherein the first splitter is a virtual impactor or a cyclone filter.

A6. System according to A5, wherein the first splitter is a virtual impactor and comprises: a first splitter inlet defining a first direction of the total flow and a first splitter outlet comprising a fork into at least a first branch connected to the first duct and a second branch connected to the second duct, wherein the first branch and the second branch are oriented such that an angular change in flow direction from the first direction to the first branch is larger than an angular change in flow direction from the first direction to the second branch.

A7. System according to any one of A0 to A6, wherein the first splitter comprises a parallel branch (16) and a perpendicular branch (17), for splitting the total flow in: the major flow that leads to the first duct via the perpendicular branch; and the minor flow that leads to the second duct via the parallel branch.

A8. System according to any one of A5 to A7, wherein the first splitter comprises an acceleration nozzle (151) for accelerating the total flow, the acceleration nozzle being arranged at an inlet of the first splitter.

A9. System according to any one of A5 to A8, wherein an outlet of the first splitter comprises at least one deceleration nozzle.

A10. System according to any one of A0 to A9, wherein the sensor (11) comprises:
an optics chamber, enabling an air flow (26) to trespass;
an electromagnetic radiation source (24), for generating a light bundle (31) through the area of the optics chamber for trespassing air;
a photon collector (28), for collecting the light scattered by particles in the trespassing air flow.

A11. System according to A10, wherein the sensor comprises a light trap (27), for receiving and absorbing the light from the radiation source after trespassing the air flow.

A12. System according to any one of A0 to A11, comprising a second splitter unit (15), arranged in the first duct, upstream from the sensor, wherein the second splitter unit is arranged for creating:
a sample flow; being a central flow; and
a sheath flow; being a coaxial jacket.

A13. System according to A12, wherein the central flow and/or the coaxial jacket are cylinder shaped.

A14. System according to A12 or A13, wherein the second splitter comprises:
a first hollow tube (18), and
a second hollow tube (19), enclosing at least a part of the first hollow tube;
a second splitter inlet (20), providing incoming air an essentially unimpeded entrance to the first hollow tube and providing incoming air a parallel entrance to the second hollow tube via a filter (21).

B0. Sensor unit, comprising a housing in which two systems according to A12 or A13 are integrated, wherein the respective electromagnetic radiation sources are one and the same device, and wherein the unit comprises a beam splitter, for receiving a light beam from the radiation source, and for splitting it into two beams, which are used in the respective systems.

B1. Sensor unit according to B0, comprising a processing unit configured for comparing the amount of particles measured in each of the two systems.

B2. A vehicle comprising a sensor system according to anyone of A0 to A14 or a sensor unit according to B0 or B1.

B3. The vehicle of B2, comprising the sensor unit according to B0 or B1, wherein the inlet of one of the two systems is connected to outside of the vehicle and the inlet of the other one of the two system is connected to the inside of the vehicle.

B4. Method for operating a sensor unit according to B0 or B1, comprising:
receiving an air flow from outside a vehicle in the inlet of a first one of the two systems;
receiving an air flow from inside the vehicle in the inlet of a second one of the two systems;
comparing the amount of particles measured in the air streams of the two systems.

B5. Method according to B4, for ventilating a vehicle according to B3, comprising:
receiving an air flow from outside the vehicle in the inlet of the first one of the two systems; receiving an air flow from inside the vehicle in the inlet of the second one of the two systems; comparing the amount of particles measured in the air streams of the two systems; and selecting one of the air streams for ventilating the vehicle.

C0. The present application describes a sensor system (1) for sensing mass concentration of particles smaller than a predetermined threshold in an air stream (4), comprising an inlet (2) for receiving a total flow of air with particles, the inlet connected to a first splitter (3) for separating the total flow of air into a major flow (5) and a minor flow (6), the major flow comprising particles smaller than the predetermined threshold and the minor flow comprising particles larger than the predetermined threshold and for leading the major flow to a first duct (7) and for leading the minor flow to a second duct (8), a joint (9), wherein the first duct and the second duct come together, an outlet (10), coupled to the joint, a sensor (11), arranged in the first duct for measuring the amount of particles smaller than the predetermined threshold comprised in the major flow. The sensor system further comprises a first flow fan (12) for drawing the total flow through the system and a second flow fan (13) for drawing the major flow through the first duct.

It is to be noted that the above examples are exemplary only and do not limit the scope of the present invention, as defined in the following claims.

The invention claimed is:

1. A sensor system for sensing mass concentration of particles smaller than a predetermined threshold in an air stream, comprising:
an inlet for receiving a total flow of air with particles, the inlet connected to:
a first splitter
for separating the total flow of air into a major flow and a minor flow;
the major flow comprising particles smaller than the predetermined threshold;
the minor flow comprising particles larger than the predetermined threshold; and
for leading the major flow to a first duct; and
for leading the minor flow to a second duct;
a joint, wherein the first duct and the second duct come together, and an outlet, coupled to the joint;
a sensor, arranged in the first duct for measuring an amount of particles smaller than the predetermined threshold comprised in the major flow;
a first flow fan for drawing the total flow through the system; and
a second flow fan for drawing the major flow through the first duct.

2. The sensor system according to claim 1, wherein the second flow fan is arranged in the first duct.

3. The sensor system according to claim 2, wherein the first flow fan and the second flow fan are configured to draw the total flow and the major flow such that a ratio of a flow rate of the major flow to a flow rate of the minor flow is smaller than 1.

4. The sensor system according to claim 2, comprising a controller for controlling the first and the second fan speeds, wherein the flow rate of the major flow and the flow rate of the minor flow are constant, wherein the first flow fan and the second flow fan are configured to draw the total flow and the major flow such that a ratio of a flow rate of the major flow to a flow rate of the minor flow is smaller than 1, wherein the first splitter is a virtual impactor or a cyclone filter.

5. The sensor system according to claim 4, wherein the sensor comprises:
an optics chamber, enabling an air flow to trespass;
an electromagnetic radiation source, for generating a light bundle through an area of the optics chamber for trespassing air;
a photon collector, for collecting light scattered by particles in the trespassing air flow.

6. The sensor system according to claim 5, comprising a second splitter unit, arranged in the first duct, upstream from the sensor, wherein the second splitter unit is arranged for creating:
a sample flow; being a central flow; and
a sheath flow; being a coaxial jacket.

7. The sensor system according to claim 1, comprising a controller for controlling the first and the second fan speeds.

8. The sensor system according to claim 1, wherein a flow rate of the major flow and a flow rate of the minor flow are constant.

9. The sensor system according to claim 1, wherein the first flow fan and the second flow fan are configured to draw the total flow and the major flow such that a ratio of a flow rate of the major flow to a flow rate of the minor flow is smaller than 1.

10. The sensor system according to claim 1 wherein the first splitter is a virtual impactor or a cyclone filter.

11. The sensor system according to claim 10, wherein the first splitter is a virtual impactor and comprises: a first splitter inlet defining a first direction of the total flow and a first splitter outlet comprising a fork into at least a first branch connected to the first duct and a second branch connected to the second duct, wherein the first branch and the second branch are oriented such that an angular change in flow direction from the first direction to the first branch is larger than an angular change in flow direction from the first direction to the second branch.

12. The sensor system according to claim 1, wherein the first splitter comprises a parallel branch and a perpendicular branch, for splitting the total flow in: the major flow that leads to the first duct via the perpendicular branch; and the minor flow that leads to the second duct via the parallel branch.

13. The sensor system according to claim 1, wherein the sensor comprises:
an optics chamber, enabling an air flow to trespass;
an electromagnetic radiation source, for generating a light bundle through an area of the optics chamber for trespassing air;
a photon collector, for collecting light scattered by particles in the trespassing air flow.

14. A sensor unit, comprising a housing and two of the systems according to claim 13 integrated in the housing, wherein the respective electromagnetic radiation sources are one and the same device, and wherein the unit comprises a beam splitter, for receiving a light beam from the radiation source, and for splitting it into two beams, which are used in the respective systems.

15. The sensor unit according to claim 14, comprising a processing unit configured for comparing an amount of particles measured in each of the two systems.

16. The sensor unit according to claim 14 configured to:
receiving an air flow from outside a vehicle in the inlet of a first one of the two systems;
receiving an air flow from inside the vehicle in the inlet of a second one of the two systems;
comparing an amount of particles measured in the air streams of the two systems.

17. The sensor unit according to claim 16, selecting one of the air streams for ventilating the vehicle.

18. The sensor system according to claim 1, comprising a second splitter unit, arranged in the first duct, upstream from the sensor, wherein the second splitter unit is arranged for creating:
a sample flow; being a central flow; and
a sheath flow; being a coaxial jacket.

19. The sensor system according to claim 18, wherein the second splitter comprises:
a first hollow tube, and a second hollow tube, enclosing at least a part of the first hollow tube;
a second splitter inlet, providing incoming air an essentially unimpeded entrance to the first hollow tube and providing incoming air a parallel entrance to the second hollow tube via a filter.

20. A vehicle comprising a first one of the sensor system according to claim 1.

21. The vehicle of claim 20, comprising a second one of the sensor system, wherein the inlet of the first one of the sensor systems is connected to an outside of the vehicle and the inlet of the second one of the sensor systems is connected to the inside of the vehicle.

* * * * *